April 21, 1970 E. U. COHLER ET AL 3,508,215

MAGNETIC THIN FILM MEMORY APPARATUS

Filed Nov. 25, 1966 3 Sheets-Sheet 1

INVENTORS.
EDMUND U. COHLER and
HARVEY RUBINSTEIN

BY Peter Xiarhos

AGENT.

United States Patent Office 3,508,215
Patented Apr. 21, 1970

3,508,215

MAGNETIC THIN FILM MEMORY APPARATUS

Edmund U. Cohler, Brookline, and Harvey Rubinstein, Lynnfield, Mass., assignors to Sylvania Electric Products Inc., a corporation of Delaware Filed Nov. 25, 1966, Ser. No. 596,939
Int. Cl. G11b *5/00;* G02b *5/18;* G02f *1/22*
U.S. Cl. 340—174 11 Claims

ABSTRACT OF THE DISCLOSURE

A thin film magnetic data processing apparatus for use in a memory correlator. A colloidal suspension of ferromagnetic particles is disposed on a magnetic film and magnetic fields are applied to discrete areas of the film to establish a first magnetization direction or a second magnetization direction in each area whereby dense-banded microdomains are established parallel to the magnetization direction in the area and information is stored in the area. The ferromagnetic particles in the colloidal suspension align with the fields of the microdomains to form magneto-optic diffraction gratings on the discrete areas of the film, the diffraction grating formed on each discrete area of the film being parallel to the magnetization direction in the area.

A multi-bit input signal is correlated with information stored in the magnetic film by applying the input signal in parallel to a plurality of rows of photosensors superimposed on corresponding rows of the diffraction gratings, and incident light is directed onto the gratings such that only the gratings parallel to the first magnetization direction diffract the incident light. The incident light diffracted from each of the gratings is received by the corresponding photosensor which gates therethrough the associated bit of the input signal to an associated output line. The row of photosensors associated with the row of stored information which best matches the input signal produces the greatest output signal.

The present invention relates to thin film magnetic data processing apparatus, and more particularly, to a high-speed memory correlator for correlating arbitrary or unknown data patterns with known stored patterns.

In many communication systems it is often necessary or desirable to correlate a received analog signal, typically converted to binary form, with a plurality or library of stored data patterns in order to determine particular characteristics of the signal or adulterations existing in the signal. Similarly, in various computer or general data processing systems it is often desirable to correlate a binary signal or an "identifier" or "tag" portion thereof with binary information stored in a memory of the associative type to extract appropriate information from the memory. An associative memory of the aforementioned type has appreciable value when employed in the solution of information retrieval problems, because all stored information relating to a particular item of interest may be extracted from the memory by searching information storage locations of the memory with a tag or identifier representing only certain portions of the stored information. All the stored information in all matching locations of the memory is then read out.

Various prior art systems and apparatus are known for correlating binary information to determine the best match between an unknown pattern and the individual patterns comprising a library of patterns. For example, correlation of binary data patterns or words has been performed by multi-aperture core memory systems utilizing multi-aperture magnetic cores of the square hysteresis loop, non-destructive read-out type. However, because of such factors as the generally high cost of multi-aperture cores, complicated winding schemes and attendant production difficulties, a large resulting assembly, and high-power driver requirements, such multi-aperture core correlators have been undesirable or impractical for use in many correlation applications.

Additionally, correlation of binary information by digital computers according to arithmetic processes, while practical for low-speed correlation of binary information, has generally been unsatisfactory for high-speed correlation of information. Moreover, such known prior art permanent storage devices as apertured cards, masks, etc., because of their relatively unalterable storage content, have proven to be too inflexible for correlation purposes where stored information must be capable of frequent modification or up-dating.

It is an object of the present invention, therefore, to provide an improved memory apparatus for use in a correlator.

It is another object of the invention to provide an alterable memory apparatus for use in a correlator for correlating arbitrary patterns with a library of prestored patterns to determine the best match therebetween.

It is a still further object of the invention to provide an improved memory apparatus usable in an associative memory system.

Brief description of invention and operation

Briefly, in accordance with the foregoing objects of the invention, a thin magnetic film memory apparatus is provided which utilizes a recently-observed "magneto-optic effect." More specifically, a magnetic film memory apparatus employing this magneto-optic effect includes a colloidal suspension of ferromagnetic particles superimposed on a thin magnetic film in which bits of information may be stored by application of magnetic fields to discrete areas of the film. The magnetic film material is selected from a class of well-known magnetic film materials exhibiting rotatable anisotropy and dense-banded microdomain structures.

The ferromagnetic particles of the colloidal suspension are aligned by the stray magnetic fields of the dense-banded microdomains of the magnetic film to form a mosaic of discrete, so-called "magnetic diffraction gratings" of either a first orientation or a second orientation in accordance with the nature of the information stored in corresponding areas of the magnetic film. More particularly, the first orientation of a diffraction grating is arbitrarily designated as revealing the presence of a binary "one" digit. The second orientation of a diffraction grating is designated as revealing the presence of a binary "zero" digit.

The binary "one" and binary "zero" information which is stored in the magnetic film and revealed by the magnetic diffraction gratings is read out in a non-destructive manner. A source of radiant energy directs an incident beam of electromagnetic radiation through an energy-directing means superimposed on the diffraction gratings and onto the plurality of diffraction gratings, each arranged in either the first or the second orientation as described hereinabove. The diffraction gratings of the first orientaiton diffract the incident beam in a direction substantially normal to the plane of the magnetic film, while the diffraction gratings of the second orientation do not. An arrangement of photo-sensitive elements, responsive to the particular wavelength of the electromagnetic radiation, one element associated with each discrete magnetic diffraction grating and, hence, each bit of stored information, is superimposed on the energy-directing means so as to receive diffracted energy from the gratings having the aforementioned first orientation. No diffracted energy is received from gratings having the second orientation. The photosensitive elements are adapted to provide indications in response to receiving diffracted energy. These indications, representative of the binary information content of the magnetic film, may be coupled to suitable utilization apparatus.

In employing the abovedescribed magneto-optic effect in the alterable memory correlator of the invention, separate multi-bit patterns and their complements are stored in individual storage rows of the thin magnetic film of the abovedescribed memory apparatus by means of a pattern storing means including a plurality of field-establishing orthogonal grid wires disposed beneath the magnetic film and defining a plurality of row and column storage locations in the magnetic film. The arrangement of photosensitive elements consists of rows and columns of elements, each having first and second terminals. One photosensitive element is provided for each row and column cross-point storage location of the magnetic film and a corresponding magnetic diffraction grating. The first terminals of the photosensitive elements in each column of the photosensitive array are connected in common via a column line of the photosensitive array to a register means adapted to contain a binary pattern and its complement to be correlated with the pattern and complement stored in each of the rows of the magnetic film. The second terminals of the aforementioned photosensitive elements of each row are connected in common via a row line of the photosensitive array to an output means.

In operation, the bits of an unknown multi-bit pattern and its complement are applied in parallel to the first terminals of the photosensitive elements of each row. When an incident beam of electromagnetic radiation, light, for example, is directed onto the diffraction gratings, the diffraction gratings having the aforementioned first orientation (indicating a binary "one") diffract the incident light onto the photosensitive elements associated therewith. As will be described, output signals are produced by the individual photosensitive elements whenever a match exists between a "one" bit of the unknown pattern or its complement and a corresponding "one" bit of a stored pattern or its complement. The individual photosensitive element output signals for each row of the photosensitive array, indicating matches of individual bits, are then summed to provide a plurality of "sum" output signals on separate row lines of the photosensitive array which are coupled to the output means. The output means then determines the address of the row of the magnetic film containing the stored pattern producing the "best match" with the unknown pattern.

The details of the invention in its principle as well as the manner in which the objects and advantages of the invention may best be achieved will be understood more fully from a consideration of the folowing description, taken in conjunction with the accompanying drawings in which:

FIG. 1 is a pictorial representation illustrating magnetic fields within a portion of a thin magnetic film exhibiting a rotatable anisotropy, useful in explaining the magneto-optic effect employed by the invention;

FIGS. 2*a* and 2*b* are enlarged and exaggerated representations illustrating magnetic diffraction gratings of the invention having a first orientation and a second orientation, respectively, and the manner in which an incident beam of radiant energy is diffracted or not diffracted;

Explanation of theory

Figure 1:
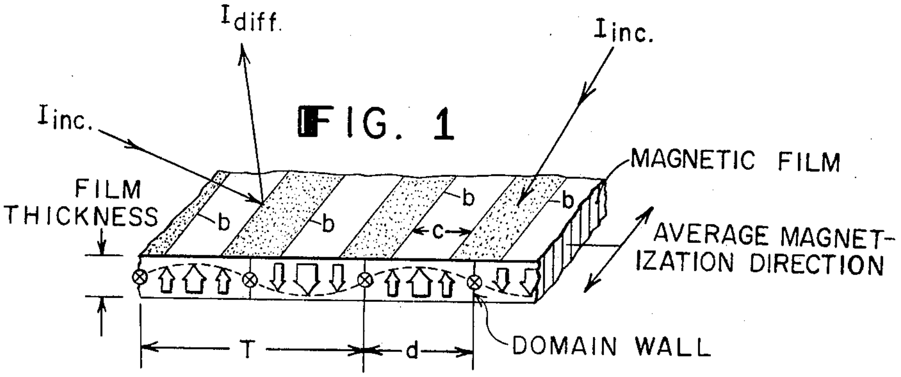

For purposes of understanding the theoretical aspects of the invention, the following explanation of the magneto-optic effect is submitted. FIG. 1 depicts in simplified form a magnetization distribution in a microscopically small portion of a thin rotatable anisotropy magnetic film such as used in the instant invention. It has been observed that a certain class of magnetic films, for example, iron, nickel, nickel-iron (Permalloy), and cobalt, exhibit a property commonly known as "rotatable anisotropy." When a uniform magnetic field larger than a certain threshold value is applied to a magnetic film, selected from the above-mentioned class of films, and having a thickness greater than a certain critical value, an average direction of magnetization parallel to the applied uniform magnetic field is established in the film. Such a film is said to exhibit the property of rotatable anisotropy because a magnetic field of sufficient magnitude, subsequently applied to the film in some arbitrary direction with respect to the previous field, causes the average magnetization direction of the film to rotate to the arbitrary direction of the subsequent field.

A magnetic film having the abovedescribed composition and rotatable anisotropy is further characterized by a magnetization distribution which consists of long, narrow, dense-banded microdomains, also referred to as "stripe domains." The magnetization in each of these microdomains has a component which lies in the plane of the film parallel to the last applied field, and a component which is normal to the plane of the film. As depicted in FIG. 1, the component of the magnetization normal to the plane of the film alternates in direction from domain to adjacent domain.

If a magnetic field is subsequently applied to the film in some arbitrary direction with respect to a previously applied field, the microdomains formed by the previous field disperse and reconstitute in accordance with the direction of the subsequently applied field. The domain walls also reconstitute themselves. As further shown in FIG. 1, the domain walls are separated by a distance $d$ equal to one-half the period T of the magnetization variation of the microdomains. A typical value of $d$ may be 6000–8000 angstrom units for Permalloy of a 10,000 angstrom units thickness. The period T and, therefore, the distance $d$, are determined by such factors as thickness, composition, internal stresses, magnetostriction, and exchange of the film.

If, after an average magnetization direction has been established in the film in the manner depicted by FIG. 1, particles of ferromagnetic iron oxide are applied to the surface of the film in accordance with the well known Bitter powder pattern technique, the particles align themselves with the fields produced by the magnetization within the microdomains and assume the form of long, uniform striations which are parallel to the average magnetization direction. These closely-formed striations, shown by $b$ in FIG. 1, constitute a diffraction grating.

Consistent with known light diffraction principles, an incident beam ($I_{inc}$) of electromagnetic radiation, for example, a collimated beam of monochromatic or white light, directed from a suitable radiant energy source onto the diffraction grating is diffracted ($I_{diff}$) or, conversely, not diffracted in accordance with the particular physical orientation of the grating with respect to the radiant energy source. That is, if the plane of incidence of a beam of light is perpendicular to the lines of the grating, the beam of light is diffracted. Conversely, if the plane of incidence of a beam of light is parallel to the lines of the grating, the beam of light is not diffracted.

Figures 2A, 2B:
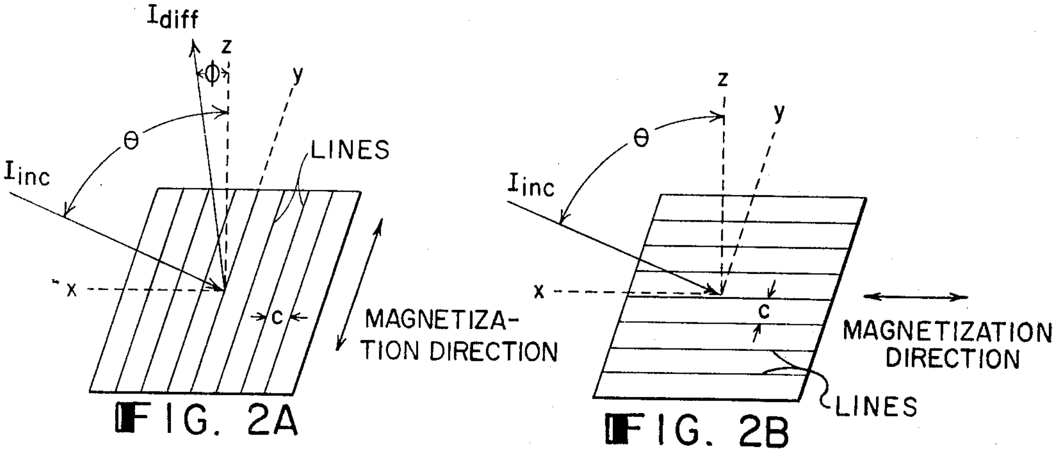

The above described diffraction and non-diffraction conditions are illustrated in greater detail in FIGS. 2*a* and 2*b*. As shown in FIG. 2*a*, if an incident beam $I_{inc}$ of light enters from an $xz$ plane which is perpendicular to the lines of powder and strikes the diffraction grating at an angle $\theta$, measured with respect to a line $z$ normal to the $xy$ plane of the diffraction grating, it is diffracted ($I_{diff}$) at an angle $\phi$ to the normal. It has been shown that the incident beam is diffracted by the grating only if $$c(\sin\theta+\sin\phi)=n\lambda$$

where $c$ is the separation distance between lines of the grating, noting FIGS. 1 and 2*a* and $n\lambda$ is an integral number of wavelengths of the incident light. Desirably, the angle $\phi$ is made as small as possible, as by maintaining a large angle $\theta$. That is, by maintaining a large angle $\theta$, the incident light is diffracted substantially normal to the plane of the grating.

FIG. 2*b* illustrates a diffraction grating having its lines oriented along a magnetization direction such that the grating is physically incapable of diffracting an incident beam entering from the same direction and angle of incidence as the incident beam in FIG. 2*a*. Thus, as an incident beam of light enters from an $xz$ plane which is parallel to the lines of powder and strikes the diffraction grating at an angle $\theta$, measured with respect to the line $z$ normal to the $xy$ plane of the diffraction grating, it is not diffracted.

In applying the previously described magneto-optic effect to the present invention, a magnetic diffraction grating of either a first orientation such as that shown in FIG. 2*a* or a second orientation such as shown in FIG. 2*b* is formed above each row and column storage location of the thin magnetic film and discloses the nature of the binary information stored in the row and column locations. That is, a grating which is disposed above a magnetic film storage location storing a binary "one" digit is oriented such that it diffracts incident light, as in FIG. 2*a*, and serves to indiatce that a binary "one" digit is stored at the storage location. Conversely, a grating which is disposed above a magnetic film storage location storing a binary "zero" digit is oriented such that no incident light is diffracted, as in FIG. 2*b*, and serves to indicate that a binary "zero" digit is stored at the storage location.

To store the binary "one" and binary "zero" information in the magnetic film, i.e., to establish a magnetic field having either the first or the second magnetization direction along which the microdomains of the film and the ferromagnetic particles in colloidal suspension may align, alternating and direct currents, as will be described hereinafter in detail, are selectively applied by drivers to pairs of insulated orthogonal row and column grid conductors disposed benath the thin magnetic film. That is, a binary "one" digit is stored at a particular row and column location of the magnetic film by applying an alternating current on the appropriate row conductor and a direct current on the associated column conductor. In response to this excitation of the row and column conductors, a magnetic field, a first magnetization direction, and a diffraction grating of the orientation shown in FIG. 2*a* are established at the associated storage location.

A binary "zero" digit is stored at a row and column location of the magnetic film by applying a direct current on a row conductor and an alternating current on an associated column conductor. In response to this excitation of row and column conductors, a magnetic field, a second magnetization direction, and a diffraction grating of the orientation shown in FIG. 2*b* are established at the associated storage location.

Thin film memory apparatus and photosensitive array assembly

Figure 3:
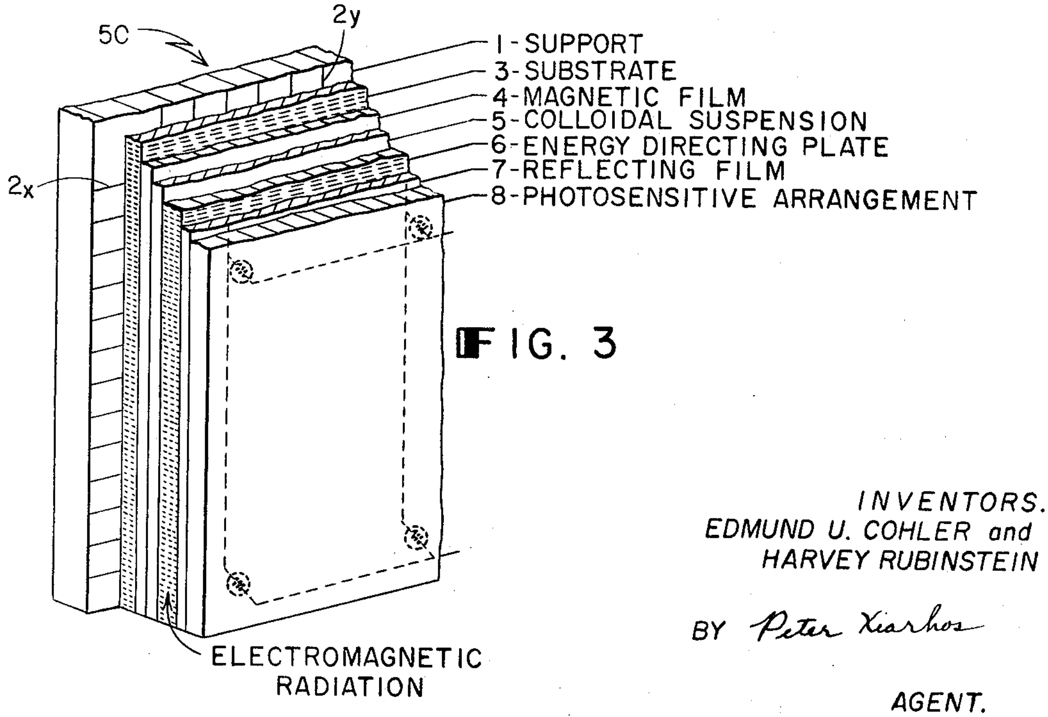
FIG. 3 is an enlarged and exaggerated perspective view of a portion of is memory apparatus and photosensitive array assembly of the invention.

Referring now to FIG. 3 there is illustrated in exaggerated form a portion of the thin film memory apparatus and photosensitive array assembly 50 of the correlator of the invention. As shown, a suitable insulating carrier or support plate 1 which may be of glass or ceramic, for example, is provided with a plurality of insulating orthogonal grid wires 2*x* and 2*y* equally spaced apart from each other. Typically, the grid wires 2*x* and 2*y* are produced by standard printed circuit techniques.

A suitably thick substrate 3, of glass, is then secured to the support plate 1 and serves as a support for a thin planar magnetic film 4 and insulates the film from the grid wires 2*x* and 2*y*. If the correlator of the invention is to be used in rugged environments where shock and vibration are present, the glass substrate 3 may be provided with an epoxy resin backing (not shown).

The magnetic film 4 is formed by vacuum-evaporating a material exhibiting a rotatable anisotropy, for example, Permalloy (84% nickel, 16% iron), onto the glass substrate 3. The thickness, composition, and method of fabrication of the magnetic film are regulated in a manner whereby the desired stable, dense-banded microdomains, or "stripe domains," are allowed to form when appropriate magnetic fields are applied to the film. Because of careful control of the abovementioned factors, when magnetic diffraction gratings are subsequently formed on the surface of the magnetic film, an optimum spacing, shown by $c$ in FIG. 2*a*, is obtained between the long, thin, continuous striations constituting the gratings. For Permalloy, a film thickness of 10,000 angstrom units has been found to be satisfactory.

An even layer of a liquid colloidal suspension 5 of finely-divided iron oxide particles is superimposed on the magnetic film. It may be recalled that iron oxide particles align themselves with the poles of microdomains established in the magnetic film upon suitable energization of row and column grid wires 2*x* and 2*y*. A suitable thick energy directing plate 6, of plastic or glass, having a high refractive index, is superimposed on the colloidal suspension 5. The main function of the plate 6 is to direct electromagnetic radiation, collimated light, for example, from a source of electromagnetic radiation, onto the magnetic diffraction gratings.

To prevent collimated light from passing through the upper surface of the glass plate 6, a thin layer of a suitable light-reflecting dielectric material 7 is coated onto the upper surface of the glass plate. More specifically, the dielectric layer 7 serves to reflect all light striking the interface of the plate 6 and the layer 7 except light diffracted by the diffraction gratings, which light strikes the interface substantially normal to the plane of the gratings.

An array 8 comprising a plurality of identical photosensitive elements, light photosensors, for example, is superimposed on the dielectric layer 7. As described previously, a photosensitive element is provided above each row and column storage location in the magnetic field as defined by the intersection of a horizontal grid wire 2*x* and a vertical grid wire 2*y*, i.e., for each elementary magnetic diffraction grating, a photosensitive element is associated therewith. Typically, the photosensitive elements may be cadmium sulphide cells formed by known film deposition techniques and having relatively high "dark" resistances and relatively low "light" resistances. However, any of a variety of photosensitive elements may be used since it is necessary only that the photosensors be receptive to the particular wavelengths of the electromagnetic radiation employed. In order to eliminate any non-uniformity of the photosensor characteristics, a resistor (not shown), produced by conventional thin film batch processing techniques, may be placed in series with each photosensitive element of the array. The entire memory apparatus and photosensitive array assembly 50 may then be coated with a thin layer of glass, if desired, to form a single, unitary, rugged structure resistant to the effects of moisture, shock, and vibration.

Brief description of correlator apparatus and operation

Figure 4:
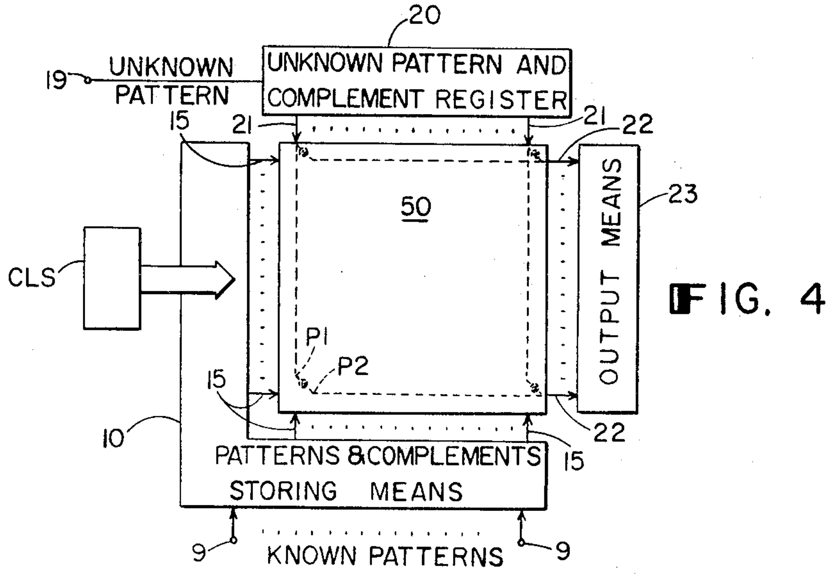
FIG. 4 is a simplified schematic block diagram of a correlator of the invention.

The general manner in which the memory apparatus and photosensitive array 50 of FIG. 3 is employed in the correlator of the invention and the manner in which the correlation function is effected may be understood from the simplified schematic block diagram of FIG. 4. A plurality of separate and individual patterns are provided on a plurality of input lines 9. These patterns, together with complements thereof, are stored in sequence or in a particular order by a patterns and complements storing means 10 in separate row locations of the thin film 4 of the assembly 50 via the output lines 15. Although not shown in detail, signals applied to the lines 15 selectively energize the intersecting horizontal and vertical grid wires 2$x$ and 2$y$ underlying the thin magnetic film 4, FIG. 3, to establish magnetic fields and hence, magnetic diffraction gratings of either the first or the second orientation.

An unknown or arbitrary multi-bit pattern to be correlated with the information stored in the aforementioned rows of the thin magnetic film 4 is introduced on a line 19 to an unknown pattern and complement register 20 which temporarily stores the unknown pattern and the complement thereof. When it is desired to correlate the multi-bit pattern with the stored patterns to determine the "best match," the separate bits of the unknown pattern and its complement are applied in parallel, upon receipt of an appropriate timing signal, by means of the register outut lines 21 to like first terminals P1 of the photosensitive elements of each row of the photosensitive array. The opposite terminals P2, i.e., the second terminals of the photosensitive elements of each row, are connected to a plurality of individual output lines 22.

Light from a collimating source CLS is directed onto a side edge or the opposite side edges of the plate 6, FIG. 3. The light strikes the gratings and is diffracted onto the photosensitive elements by various ones of the magnetic diffraction gratings, that is, the gratings having the first orientation as in FIG. 2*a*. A current of a predetermined relatively large value flows through each photosensitive element to the output lines 22 only where a match exists between a "one" bit of the unknown pattern or its complement and a respective "one" bit of a stored pattern or its complement. An output means 23 then indicates the row of the magnetic film containing a stored pattern providing the highest output level on an output line 22 and thus the greatest number of individual matches.

Detailed discussion of correlator apparatus

Figure 5:
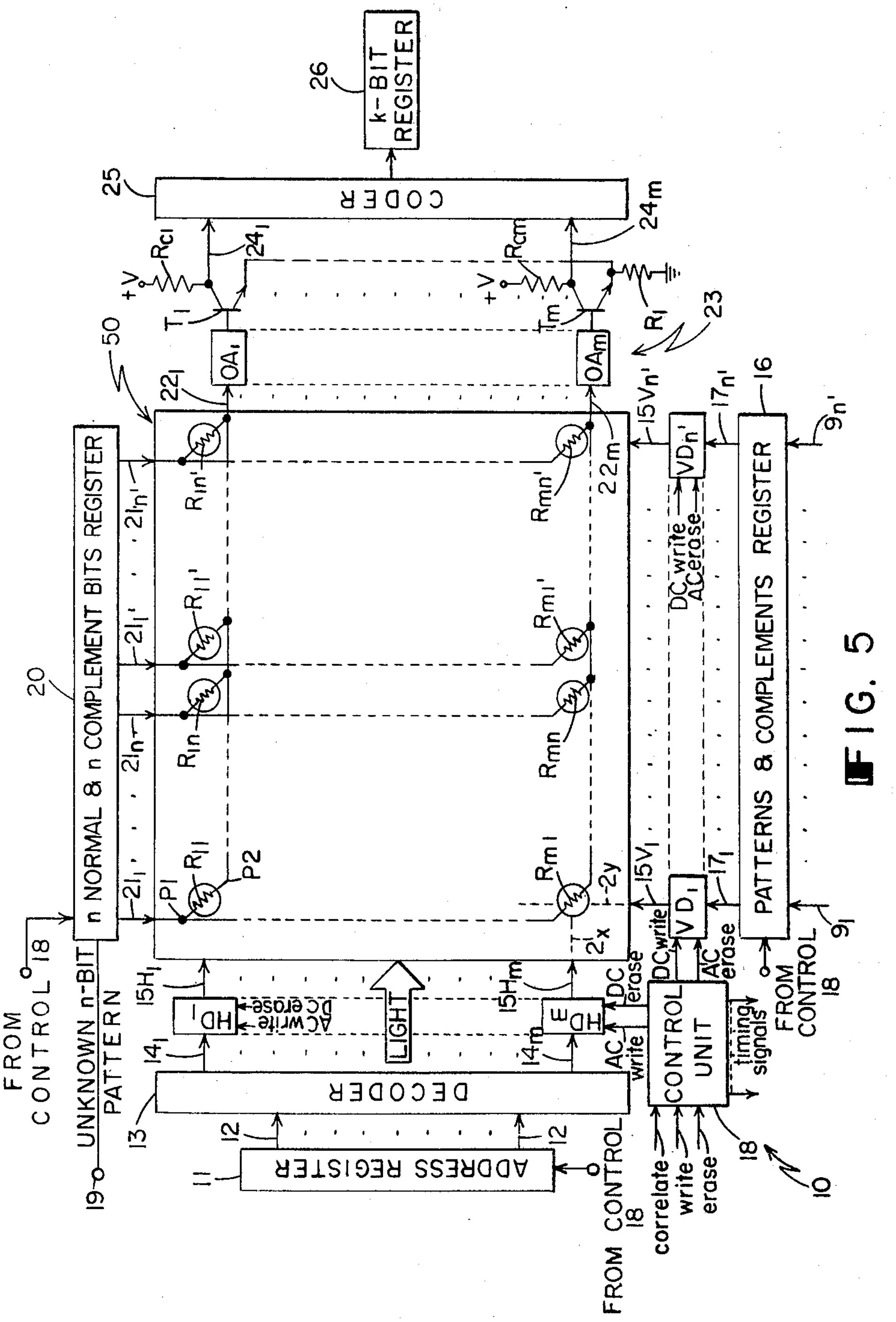
FIG. 5 is a more detailed schematic diagram of the correlator of FIG. 4.

FIG. 5 shows in greater detail the correlator depicted in genreal block diagram form in FIG. 4. Referring to FIG. 5, the memory apparatus and photosensitive array assembly 50, such as illustrated in FIG. 3, has $m$ rows and 2$n$ columns of magnetic diffraction gratings and photosensitive elements of equal resistance, the rows of photosensitive elements being designated generally by $R_{11} \ldots R_{1n} \ldots$ and $R_{11}' \ldots R_{1n}'$ and $R_{m1} \ldots R_{mn}$ and $R_{m1}' \ldots R_{mn}'$, and the columns of photosensitive elements by $R_{11} \ldots R_{m1}$, $R_{1n} \ldots R_{mn}$, $R_{11}' \ldots R_{m1}'$, and $R_{1n}' \ldots R_{mn}'$.

As mentioned previously, each photosensitive element overlies a magnetic diffraction grating the orientation of which indicates the binary "one" or binary "zero" nature of the information stored in the magnetic film at the intersection of each row and column conductor. In operating the correlator of the invention to perform the correlation function, each photosensitive element is adapted to receive diffracted light from binary "one" designated gratings only, and to gate current of a predetermined relatively high value whenever a match exists between a "one" bit of the unknown input pattern or its complement and a respective "one" bit of a known stored pattern or its complement. That is, a "one" bit signal on a line 21 from the register 20, when applied to the first terminal P1 of a photosensitive element produces current flow in the photosensitive element in response to diffracted light striking the photosensitive element and reducing its resistance. Thus, using row photosensitive elements $R_{11} \ldots R_{1n}'$, as an example, and referring to FIG. 5 photosensitive elements $R_{11} \ldots R_{1n}$ are individually adapted to gate current from an individual output line 21 of the register 20 to an output line 22$_1$ for each match existing between a "one" bit of an unknown $n$-bit pattern stored by the register 20 and a respective "one" bit of an $n$-bit pattern stored in the storage locations of the thin magnetic film beneath the photosensitive elements $R_{11} \ldots R_{1n}$.

Similarly, photosensitive elements $R_{11}' \ldots R_{1n}'$ are individually adapted to gate current from an individual output line 21 of the register 20 to the line 22$_1$ for each match existing between a "one" bit of the complemented $n$-bit pattern and a respective "one" bit of a stored complemented $n$-bit pattern in register 20. In like manner, the individual photosensitive elements of the remaining rows of the photosensitive array conduct current to their associated output lines 22 for each "match" condition.

In situations where a perfect bit for bit match is found to exist between an unknown $n$-bit pattern and a stored $n$-bit pattern, $n$ of the 2$n$ photosensitive elements of the "best match" row receive diffracted light and switch current from the register 20 through reduced resistances to the associated output line 22. Where no match or an imperfect match exists for a given row, less than $n$ photosensitive elements of the row gate current and, accordingly a smaller amplitude signal is applied to the associated output line. The above described match and mismatch situations may be readily understood by the examples set forth in the table submitted below. Although a value of $n$ equal to five has been selected for illustrative purposes, it is to be understood that such value is in no way limiting.

| Unknown Pattern ($n$=5) | | Complemented Unknown Pattern ($n$=5) | |
|---|---|---|---|
| 0 1 1 1 0 | | 1 0 0 0 1 | |
| | **Stored Patterns ($n$=5)** | **Stored Complemented Patterns ($n$=5)** | **Total Number of Matches** |
| (a) | 1 1 0 1 0 | 0 0 1 0 1 | 2+1=3 |
| (b) | 0 1 1 1 1 | 1 0 0 0 0 | 3+1=4 |
| (c) | 1 1 0 0 1 | 0 0 1 1 0 | 1+0=1 |
| (d) | 0 1 1 1 0 | 1 0 0 0 1 | [1] 3+2=5 |
| (e) | 1 1 1 0 1 | 0 0 0 1 0 | 2+0=2 |
| (f) | 1 0 0 0 1 | 0 1 1 1 0 | 0+0=0 |
| . | . | . | . |
| . | . | . | . |
| . | . | . | . |
| . | . | . | . |

[1] Perfect match.

Erasing of film

The detailed manner in which the library of binary patterns are stored in the magnetic film of the correlator of FIG. 5 will now be described. Initially, all of the row storage locations of the magnetic film are placed in "erased" condition, that is, set to "zero." The erasing function is accomplished by means of apparatus shown generally by reference numeral 10 in FIG. 5. Briefly, an address register 11 is provided for supplying binary output signals, representative of addresses of individual rows of the magnetic film, upon receipt of an appropriate timing signal from an external control unit 18. A decoder 13 decodes each binary-coded signal from the register 11 and supplies an output signal to an input 14 of each of a plurality of alternating and direct current horizontal drivers $HD_1 \ldots HD_m'$ to be described more fully in connection with FIG. 6.

Upon receipt of an appropriate DC ERASE signal from the control unit 18, each horizontal driver HD produces a direct current output signal on one of the horizontal driver output lines $15H_1 \ldots 15H_m$ to a corresponding horizontal grid wire 2x, such as represented by a dotted line in FIG. 5. At the same time, alternating current signals are applied to each vertical grid wire 2y via a plurality of output lines 15V$_1$ . . . 15V$_n$, from a plurality of vertical alternating and direct current drivers VD$_1$ . . . VD$_n$. The alternating current signals on lines 15V$_1$ . . . 15V$_n$, are produced by clearing a patterns and complements register 16 in a known manner such that binary "one" signals only are introduced to the inputs of the vertical drivers VD$_1$ . . . VD$_n$'. When an AC ERASE signal is received from the control unit 18, alternating current signals are applied by the vertical drivers VD$_1$ . . . VD$_n$' to the vertical driver output line 15V$_1$ . . . 15V$_n$', and thus to the vertical grid wires 2y.

The direct current signal on a selected horizontal grid wire 2x and the alternating current signals on the vertical grid wires 2y coact to establish a field having an average magnetization direction such that the finely-divided particles of ferromagnetic iron oxide in colloidal suspension align themselves to form magnetic diffraction gratings of the second orientation shown in FIG. 2*b*.

It may be noted that at this point, in its erased form, the selected row contains stored binary "zeros" only. That is, the magnetic diffraction gratings produced are joined end to end for a length equal to the length of the horizontal grid wire underlying the selected row of the storage film and have but a single orientation, such as shown by FIG. 2*b*. Accordingly, the gratings are incapable of diffracting incident light. In a similar manner the remaining rows of the film can be erased, or set to "zero."

Writing

The manner in which selected ones of the mangetic diffraction gratings may be switched to assume the first orientation such as shown in FIG. 2*a* to designate stored binary "one" data, will be understood best by a description of the manner in which an exemplary pattern, consisting of *n* bits, is stored in a selected row of the magnetic film.

Referring again to FIG. 5, a binary coded output signal, representative of a row of the storage film in which the n-bit exemplary pattern is to be stored, is provided by the address register 11 upon receipt of an appropriate timing signal from the control unit 18. The address register 11 is of a conventional shift register type having a plurality of flip-flop stages. The output signals of the register 11 are applied to the output lines 12 in FIG. 5.

Once the binary address for a particular row storage location has been selected and an appropriate timing signal has been received from the control unit 18, a binary-coded address signal is applied by means of the output lines 12 to the decoder 13, comprising conventional coded, multi-input gates. The decoder 13 decodes the binary-coded signal appearing at its input to produce a decimal output signal representing a digit 1 . . . *m* on one of the decoder output lines 14$_1$ . . . 14$_m$ representing the selected row of the magnetic film. This output signal is applied to an input of a selected one of the plurality of horizontal alternating and direct current drivers HD$_1$ . . . HD$_m$. Upon receipt of an AC WRITE signal from the control unit 18, an alternating current signal is applied by the selected driver HD to an associated one of the plurality of horizontal driver output lines 15H$_1$ . . . 15H$_m$ and, thus, to the corresponding horizontal grid wire 2x.

While a binary coded address signal is being generated by the address register 11, the exemplary *n*-bit binary pattern and its complement are entered into the patterns and complements register 16 via the parallel register input lines 9$_1$ . . . 9n. Upon receipt of an appropriate timing signal from the control unit 18, the patterns and complements register 16, comprising conventional flip-flops, transfers the binary pattern and its complement by means of the plural, parallel output lines 17$_1$ . . . 17$_n$' to the inputs of the plurality of vertical alternating and direct current drivers VD$_1$ . . . VD$_n$', of a construction identical to the horizontal drivers HD$_1$ . . . HD$_m$.

Upon receipt of a DC WRITE signal from the control unit 18, direct current signals, equal in magnitude to the selected horizontal alternating current signal from the selected driver HD are applied to the lines 15V$_1$ . . . 15V$_n$', by the drivers VD that received binary "one" data from the output lines 17$_1$ . . . 17$_n$' of the patterns and complements register 16. The direct current signals on the lines 15V$_1$ . . . 15V$_n$' are applied to the selected vertical grid wires 2y concurrent with the application of alternating current signals to the selected horizontal driver output line 15H$_1$ . . . 15H$_m$ and horizontal grid wire 2x, as described above.

The direct current signals, producing fields in discrete portions of the selected row at large angles to the alternating current field, cause the diffraction gratings at the selected discrete storage locations of the row of the magnetic film to reform in the first orientation, designating a binary "one" such as shown by FIG. 2*a*.

Although the storing of one exemplary pattern and its complement only has been described, it is obvious that the remaining patterns and their complements constituting the library of patterns are stored in the separate row storage locations of the magnetic film in similar manner. In this connection, it is necessary only to select an appropriate address representing a desired row of the magnetic film and to enter a known pattern and its complement into the patterns and complements register 16, either in parallel, as shown, or serially. The known patterns may be entered sequentially or in any desired order and, if the number of patterns is exceedingly large, a plurality of thin film memories and photosensitive arays may be arranged in a stacked assembly. Any information stored in the rows of the magnetic film may be erased, i.e., set to "zero", by simultaneously applying a DC ERASE signal and an AC ERASE signal from the control unit 18 to the horizontal drivers HD$_1$ . . . HD$_m$ and to the vertical drivers VD$_1$ . . . VD$_{n'}$, respectively. The manner in which correlation of an unknown input pattern with a library of stored patterns takes place can now be fully appreciated.

Correlation

An unknown *n*-bit pattern is serially introduced via an input line 19 in FIG. 5 to an *n* normal and *n* complement bits register 20, comprising conventional flip-flops, and stored therein. The bits of the unknown pattern and the bits of the complemented pattern are then individually applied in parallel via the lines 21$_1$ . . . 21$_n$ and 21$_1$' . . . 21$_n$' upon receipt of an appropriate timing signal from the control unit 18, to the first terminals P1 of the photosensitive elements associated with each and every row of the photosensitive array. Thus, the photosensitive elements of each column of the array receive the same bit from the register 20.

A source of light from a collimating light source, CLS, is then directed onto an edge or the opposite edges of the plastic or glass plate 6 such as shown in FIG. 3. As previously described, the light directed onto the plate strikes the magnetic diffraction gratings with glancing incidence and is diffracted by the gratings having the first orientation in a direction substantially normal to the plane of the gratings. The diffracted light is received by all photosensitive elements associated with the gratings having the first orientation. A current output signal is gated through the terminals P2 to the output lines 22$_1$ . . . 22$_m$ by each photosensitive element associated with a diffraction grating having the first orientation and receiving a "one" bit from the register 20. In this manner, the unknown pattern and its complement is correlated with a known pattern and its complement stored in each row of the thin magnetic film. Accordingly, signals of various amplitudes, indicative of the number of matches found to exist, are produced by each row of photosensitive elements on the output lines $22_1 \ldots 22_m$. These signals, summed by individual operational amplifiers $OA_1 \ldots OA_m$ of conventional type, connected to the lines $22_1 \ldots 22_m$, respectively, are applied to a threshold or correlation level detector circuit for determining the specific output line of the output lines $22_1 \ldots 22_n$ representing the "best match" or the highest degree of correlation.

The threshold circuit of the invention comprises a plurality of emitter followers utilizing conventional npn transistors $T_1 \ldots T_m$. The collector of each transistor is connected through a current-limiting resistor, $R_{C_1} \ldots R_{C_m}$ to a direct current power supply +V. As shown, the emitters of the transistors $T_1 \ldots T_m$ are connected in common to ground via a resistor R1 and the collectors are connected via the lines $24_1 \ldots 24_m$ to a conventional coder 25. The signals from the operational amplifiers are applied to the bases of the transistors.

In operation, the threshold circuit selects the output line of the plurality of the output lines $22_1 \ldots 22_m$ having the greatest amplitude. Normally, each transistor is in a non-conducting state with the full potential +V appearing across each collector resistor. When a plurality of signals appearing on the lines from the operational amplifiers are applied to the bases of the transistors $T_1 \ldots T_m$, the transistor having the highest base-collector potential is caused to conduct, thereby providing full emitter current with a resulting decreased potential at the collector. Because of the relatively large potential drops across the collector resistors of the remaining transistors and because of the presence of the full emitter current of the conducting transistor at the emitters of the remaining transistors, the base-collector voltage of the remaining transistors remains too low to permit conduction therein. Thus, only one transistor conducts, namely the transistor associated with the "best match" output line.

The coder 25 receives the "best match" signal on one of the lines $24_1 \ldots 24_m$ from the collector of the conducting transistor and codes the signal into a $k$-bit address where $2^k = m$, the number of rows in the magnetic film and, thus, the number of stored patterns. The coded address is then stored in a conventional $k$-bit register 26, or alternatively, fed to other utilization devices such as display units or appropriate sections of a computer.

Alternating and direct current driver

Figure 6:
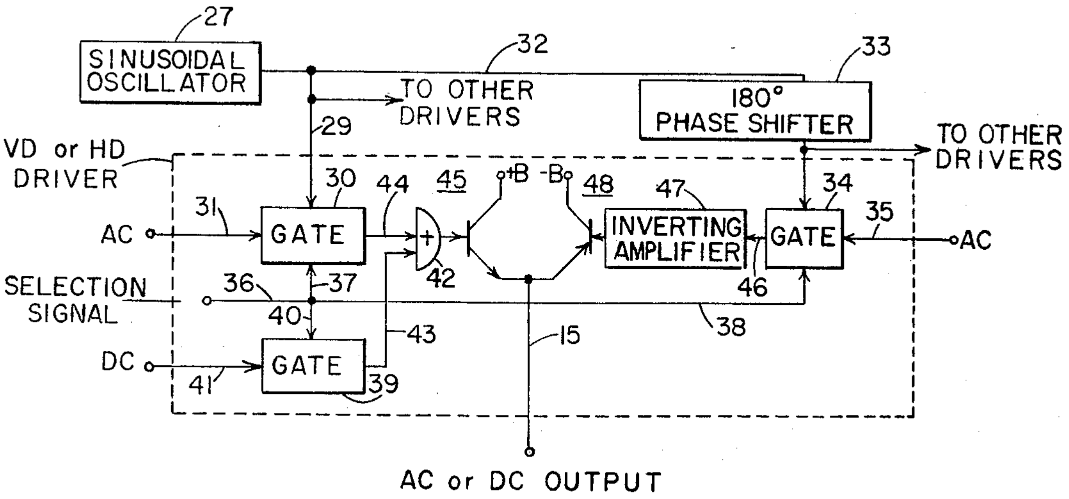
FIG. 6 is a detailed schematic diagram of alternating and direct current driver circuitry of the invention employed in storing information in the thin magnetic film.

FIG. 6 illustrates in schematic diagram form one of the alternating and direct current drivers VD and HD utilized by the correlator of FIG. 5 and shown connected to the decoder output lines $14_1 \ldots 14_m$ and the patterns and complementary register output lines $17_1 \ldots 17_{n'}$. A sinusoidal oscillator 27 applies an alternating current signal of suitable amplitude and frequency via a gate input line 29 to a first input of a gate 30, also having second and third input lines 31 and 37. Typically, the gate 30 is a conventional diode gate. The sinusoidal output of the oscillator 27 is also applied by means of a line 32 to an 180° phase shifter 33, the 180° shifted output of which is applied to a first input of a gate 34, similar to the gate 30, also having second and third input lines 35 and 38.

A selection signal, such as appearing on one of the horizontal decoder output lines $14_1 \ldots 14_m$ or more of the vertical register output lines $17_1 \ldots 17_{n'}$, FIG. 5, is introduced via a selection signal line 36 to the third input line 37 of the gate 30 and the third input line 38 of the gate 34. The selection signal is also applied to a first input line 40 of a gate 39, also a diode gate, having a second input line 41. The output line 43 of the gate 39 and the output line 44 of the gate 30 are applied to separate inputs of a buffer OR gate 42, typically a diode OR gate.

The output of the OR gate 42 is connected to the base of an npn transistor 45 the collector of which is connected to a suitable positive direct current source +B, and the emitter of which is connected to an output grid selection line 15. Although not shown in FIG. 6, the grid selection line 15 is connected to a horizontal grid wire $2x$ or a vertical grid wire $2y$, noting FIG. 5. The output of the gate 34 is applied by a line 46 to an inverting amplifier 47, the inverted output of which is connected to the base of a pnp transistor 48. The collector of the transistor 48 is connected to a suitable source of current, −B, and the emitter is connected to the output selection line 15.

To produce an alternating current at the output line 15 of the driver illustrated in FIG. 6, a sinusoidal output from the oscillator 27 is applied to the gate 30 and to the phase shifter 33. An AC WRITE or an AC ERASE signal, depending on whether the driver is being used as a horizontal driver HD (to write) or a vertical driver VD (to erase), is applied by the control unit 18, FIG. 5, to the second inputs of the gates 30 and 34 by means of the lines 31 and 35, respectively. When a selection signal is present on the line 36, a positive going signal is produced on the output line 44 which is passed by the OR gate 42 to the base of the npn transistor 45, causing the transistor 45 to conduct and to produce a positive half-cycle portion of an alternating current signal on the output line 15.

In similar manner, the 180° shifted output of the phase shifter 33 is applied to the gate 34, the output of which is applied by means of the line 46 to the inverting amplifier 47. The inverting amplifier 47 inverts the positive-going signal appearing at its input and produces a negative-going signal which is applied to the base of the transistor 48. This negative-going signal causes the transistor 48 to conduct and to produce a negative half-cycle portion of an alternating current signal on the output line 15. The two outputs of the transistors 45 and 48, one a positive half-cycle of alternating current and the other a negative half-cycle, 180° out of phase, thus combine to produce a complete sinusoid of alternating current on the output line 15.

To produce a direct current signal on the output line 15, a selection signal such as that appearing on the horizontal lines $14_1 \ldots 14_m$ or the vertical lines $17_1 \ldots 17_{n'}$, FIG. 5, is applied to an input of the gate 39 by means of the line 40. A DC WRITE or a DC ERASE signal, depending on whether the driver is being used as a vertical driver VD (to write) or a horizontal driver HD (to erase), is applied by the control unit 18, FIG. 5, to the input line 41. A positive direct current signal is produced on the output line 43 of the gate 39 and is applied by the OR gate 42 to the base of the npn transistor 45. In response to the signal on the base of the transistor 45, the transistor conducts and a direct current output signal is produced on the output line 15.

While there has been shown and described, a magnetic thin film memory apparatus and photosensitive array assembly and a correlator for correlating an unknown or arbitrary $n$-bit pattern with $mn$-bit patterns, it is to be understood that the memory apparatus and photosensitive array assembly of the invention may also be used as an associative memory wherein fewer than $n$ bits, constituting a tag or identifier, are correlated with the $mn$-bit patterns stored in the magnetic film. Under these circumstances, where more than a single "best match" condition is found to exist, suitable additional or modified circuitry may be utilized for registering the identities or addresses of all "best match" locations or for non-destructively reading out all of the information stored in each row of the magnetic film.

It will now be apparent that a novel memory apparatus and alterable memory correlator which are readily constructed, rugged, compact, and adapted for high-speed operation have been disclosed in such full, clear, concise and exact terms as to enable any person skilled in the art to which they pertain to make and use the same. It will also be apparent that various changes and modifications may be made in form and detail by those skilled in the art without departing from the spirit and scope of the invention.

What is claimed is:

1. Thin film magnetic data processing apparatus comprising:
- a magnetic film exhibiting a rotatable anisotropy and a dense-banded microdomain structure;
- means for applying magnetic fields to discrete areas of the film to establish a first magnetization direction or a second magnetization direction in each area whereby dense-banded microdomains are established parallel to the magnetization direction in the area and information is stored in the area;
- a fluid layer disposed on the magnetic film and containing ferromagnetic particles adapted in response to the fields of the microdomains to form diffraction gratings on the discrete areas of the film, the diffraction grating formed on each discrete area of the film being parallel to the magnetization direction in the area;
- a source of electromagnetic radiation;
- radiation-directing means adapted to direct radiation from the source of electromagnetic radiation onto the diffraction gratings such that the diffraction gratings parallel to the first magnetization direction diffract the radiation directed thereon and the diffraction gratings parallel to the second magnetization direction do not diffract the radiation directed thereon; and
- a plurality of photosensitive elements arranged to receive radiation diffracted from the gratings, each of said plurality of photosensitive elements having a first operating condition in the absence of radiation diffracted from a diffraction grating and a second operating condition in the persence of radiation diffracted from a diffraction grating, each of said plurality of photosensitive elements changing from the first operating condition to the second operating condition in response to radiation diffracted from a diffraction grating.

2. Thin film magnetic data processing apparatus in accordance with claim 1 wherein the means for applying magnetic fields to the discrete areas of the film includes a plurality of orthogonal grid wires disposed adjacent to the magnetic film.

3. Thin film magnetic data processing apparatus in accordance with claim 1 wherein the source of electromagnetic radiation includes a collimating light source for directing a beam of light onto the radiation directing means.

4. Thin film magnetic data processing apparatus in accordance with claim 3 wherein the radiation-directing means includes a glass plate having a high refractive index disposed on the fluid layer.

5. A memory correlator comprising:
- a magnetic film exhibiting a rotatable anisotropy and a dense-banded microdomain structure;
- means for applying magnetic fields to discrete areas of the film to establish a first magnetization direction or a second magnetization direction in each area whereby dense-banded microdomains are established parallel to the magnetization direction in the area and information is stored in the area;
- a fluid layer disposed on the magnetic film and containing ferromagnetic particles adapted in response to the fields of the microdomains to form diffraction gratings on the discrete areas of the film, the diffraction grating formed on each discrete area of the film being parallel to the magnetization direction in the area;
- a source of electromagnetic radiation;
- radiation-directing means adapted to direct electromagnetic radiation from the source of electromagnetic radiation onto the diffraction gratings such that the diffraction gratings parallel to the first magnetization direction diffract the radiation directed thereon and the diffraction gratings parallel to the second magnetization do not diffract the radiation direction thereon;
- a plurality of photosensitive elements arranged to receive radiation diffracted from the diffraction gratings;
- coupling means for transferring input information signals to the plurality of photosensitive elements;
- each of said photosensitive elements being operable to gate therethrough an input information signal from said coupling means in response to receiving radiation diffracted from a diffraction grating parallel to the first magnetization direction.

6. A memory correlator in accordance with claim 5 wherein:
- the discrete areas of the magnetic film are arranged in rows and columns, and
- the plurality of photosensitive elements comprises an array of corresponding rows and columns of photosensitive elements, one photosensitive element associated with each diffraction grating, and each photosensitive element having an input terminal connected to the information coupling means and an output terminal.

7. A memory correlator in accordance with claim 6 further including an output means coupled to the output terminals of the photosensitive elements and operative to indicate the best match between input information and stored information.

8. A memory correlator in accordance with claim 7 wherein said output means comprises:
- a threshold circuit means for providing a signal representing the best match between input information and stored information;
- a coding circuit means coupled to the threshold circuit means for coding the signal from the threshold circuit means into $k$-bits, where $k$ is a positive integer; and
- a $k$-bit register means coupled to the coding circuit means for storing the coded signal from the coding circuit means.

9. A memory correlator in accordance with claim 5 wherein the magnetic film is adapted to store a library of $mn$-bit patterns and their complements, where $m$ and $n$ are positive integers and $m$ represents the number of patterns stored.

10. A memory correlator in accordance with claim 9 wherein the information coupling means is adapted to transfer an $n$-bit pattern and its complement to the plurality of photosensitive elements.

11. A memory correlator in accordance with claim 10 wherein:
- the discrete areas of the magnetic film are arranged in rows and columns;
- the plurality of photosensitive elements comprises an array of corresponding rows and columns of photosensitive elements, one photosensitive element associated with each diffraction grating and each discrete area of the magnetic film, and each photosensitive element having an input terminal and an output terminal;
- said photosensitive elements being responsive to diffracted radiation from the diffraction grating parallel to the first magnetization direction, indicating a stored "one" bit, to gate signals therethrough from the information coupling means to the output terminals for each match between a "one" bit of the $n$-bit input pattern or its complement and a corresponding "one" bit of a stored $n$-bit pattern or its complement;
- said memory correlator further including:
  - threshold circuit means for providing a signal representing the row of photosensitive elements having the greatest number of gated signals;

a coding circuit means for coding the signal from the threshold circuit means into $k$ bits, where $2^k$ is equal to $m$; and a $k$-bit register means for storing the coded signal from the coding circuit means.

References Cited

UNITED STATES PATENTS 2,984,825 5/1961 Fuller et al. ---------- 340—174

OTHER REFERENCES

Publication I, Applied Physics Letters, Magneto-Optical Dispaly Panel with Memory, vol. 6, No. 11, June 1, 1965, pp. 216–218.

JAMES W. MOFFITT, Primary Examiner

U.S. Cl. X.R.

250—219; 350—151, 162